United States Patent [19]
Arnold, Jr. et al.

[11] Patent Number: 5,432,205

[45] Date of Patent: Jul. 11, 1995

[54] METHOD OF PREPARATION OF REMOVABLE SYNTACTIC FOAM

[75] Inventors: Charles Arnold, Jr.; Dora K. Derzon; Jill S. Nelson; Peter B. Rand, all of Albuquerque, N. Mex.

[73] Assignee: The United States of America as represented by the United States Department of Energy, Washington, D.C.

[21] Appl. No.: 238,542

[22] Filed: May 5, 1994

[51] Int. Cl.⁶ ............................................... C08J 9/32
[52] U.S. Cl. ........................................ 521/54; 521/55; 523/218; 523/219
[58] Field of Search .................. 521/54, 55; 523/219, 523/218

[56] References Cited

U.S. PATENT DOCUMENTS

| | | | |
|---|---|---|---|
| 3,832,426 | 8/1974 | Malthouse et al. | 264/29 |
| 3,849,350 | 11/1974 | Matzo | 521/54 |
| 3,864,181 | 2/1975 | Wolinski et al. | 521/54 |
| 4,202,279 | 5/1980 | Rand | 109/34 |
| 4,442,018 | 4/1984 | Rand | 252/307 |
| 4,832,881 | 5/1989 | Arnold et al. | 264/29.7 |
| 5,120,769 | 6/1992 | Dyksterhouse et al. | 521/54 |
| 5,278,194 | 1/1994 | Tickner et al. | 521/54 |

OTHER PUBLICATIONS

Morehouse, D. S. et al, "Foamed Thermoplastic Microspheres in Reinforced Polyesters," *SPE Journal*, vol. 25, pp. 45–50, May, 1969.

Brooks, J. D. et al, "Polystyrene–Urethane Composite Foam for Crash Padding Applications," *Journal of Cellular Plastics*, pp. 232–235, Sep./Oct., 1973.

Puterman, M. et al, "Syntactic Foams I. Preparation, Structure and Properties," *Journal of Cellular Plastics*, pp. 223–229, Jul./Aug., 1980.

*Primary Examiner*—Morton Foelak
*Attorney, Agent, or Firm*—George H. Libman

[57] ABSTRACT

Easily removable, environmentally safe, low-density, syntactic foams are disclosed which are prepared by mixing insoluble microballoons with a solution of water and/or alcohol-soluble polymer to produce a pourable slurry, optionally vacuum filtering the slurry in varying degrees to remove unwanted solvent and solute polymer, and drying to remove residual solvent. The properties of the foams can be controlled by the concentration and physical properties of the polymer, and by the size and properties of the microballoons. The suggested solute polymers are non-toxic and soluble in environmentally safe solvents such as water or low-molecular weight alcohols. The syntactic foams produced by this process are particularly useful in those applications where ease of removability is beneficial, and could find use in packaging recoverable electronic components, in drilling and mining applications, in building trades, in art works, in the entertainment industry for special effects, in manufacturing as temporary fixtures, in agriculture as temporary supports and containers and for delivery of fertilizer, in medicine as casts and splints, as temporary thermal barriers, as temporary protective covers for fragile objects, as filters for particulate matter, which matter may be easily recovered upon exposure to a solvent, as in-situ valves (for one-time use) which go from maximum to minimum impedance when solvent flows through, and for the automatic opening or closing of spring-loaded, mechanical switches upon exposure to a solvent, among other applications.

14 Claims, 1 Drawing Sheet

FIGURE
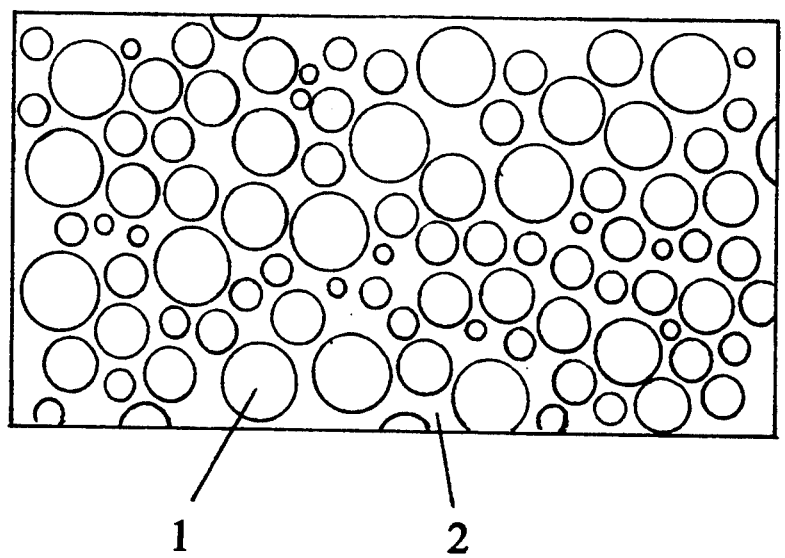
1    2

METHOD OF PREPARATION OF REMOVABLE SYNTACTIC FOAM

The United States Government has rights in this invention pursuant to Contract No. DE-AC04-76DP00789 between the Department of Energy and American Telephone and Telegraph Company.

FIELD OF THE INVENTION

The invention relates to the preparation of soluble syntactic foams which are useful in applications requiring a readily removable, non-toxic, formable mass having the strength of a typical rigid, polymeric, syntactic foam, and which can be used in manufacturing, medicine, agriculture, oil and gas exploration, mining, and in other applications.

BACKGROUND OF THE INVENTION

Syntactic foams are composite materials in which hollow particles, such as microspheres are dispersed in a resin matrix. It is known in the prior art that syntactic foams can be prepared whose composition is such that they cannot be dissolved in water or low-molecular weight alcohols. For example, U.S. Pat. No. 5,120,769 (Dyksterhouse et al.) discloses a foam which incorporates water as a non-solvent and whose thermoplastic component is not readily soluble in water or low-molecular weight alcohols. Also known in the prior art is the preparation of syntactic foam composed of carbon microspheres in a carbon matrix, as disclosed in U.S. Pat. No. 3,832,426 (Malthouse et al.), which foam would not be soluble in water or low-molecular weight alcohols.

SUMMARY OF THE INVENTION

It is an object of this invention to have a process for producing a syntactic foam in which no harmful vapors are emitted, which is non-toxic in its finished state, and which may be disintegrated with water or low-molecular weight alcohols which are relatively benign compared with known solvents used to disintegrate prior-art foams. It is another object of this invention to have syntactic foams that differ from conventional syntactic foams in that the resin component in the syntactic foam of this invention is not crosslinked and is therefore soluble in water or alcohol, and the interstitial volume, or space between the microspheres, can be incompletely filled with resin thereby reducing the foam density and also enhancing the penetration of the water or alcohol used to dissolve the foam.

The syntactic foams of this invention may be used in manufacturing, medicine, agriculture, oil and gas exploration, mining, and in other applications.

An easily removable, environmentally safe, low-density, syntactic foam can be prepared by mixing a first component solution of a water and/or alcohol-soluble polymer with second component, insoluble microspheres to produce a pourable slurry. Unwanted solute polymer may then be removed to control the density of the final product. The product is then dried to remove residual solvent. This process differs from the processes of the prior art in the preparation of conventional syntactic foams where liquid resin precursors are mixed with microspheres and cured in place. In this invention the quantity of polymer of the first component solution, which polymer resides in the interstitial volume between the second component microspheres, may be adjusted from that which essentially fills the interstitial volume to that which is merely sufficient to bind the microspheres together by the degree of vacuum filtration of the slurry.

BRIEF DESCRIPTION OF THE DRAWING

The accompanying drawing, which is incorporated in and from part of the specification, illustrates an embodiment of the present invention and, together with the description, serves to explain the principles of the invention.

The FIGURE shows a typical cross section through a prepared syntactic foam of this invention.

DETAILED DESCRIPTION OF THE PREFERRED EMBODIMENTS

According to a preferred embodiment of the present invention, easily removable, environmentally safe, low-density, syntactic foam is prepared by dissolving a solute polymer in solvent water, alcohol, or water and alcohol to produce a first component solution. A second component, gas-filled, insoluble microspheres, such as insoluble polymeric or glass microspheres, 10 to 180 microns in diameter, is added to the solution and stirred to achieve a uniform, pourable slurry, all at room temperature. The slurry may be vacuum filtered to varying degrees to remove a predetermined fraction of unwanted solute polymer and solvent solution. The slurry is then dried to remove unwanted solvent by heating to a temperature and for a time no greater than that which would detrimentally affect the most heat-sensitive component or create bubbles in the polymer in the interstitial volume.

The resulting product is a formed syntactic foam, a cross section of which is shown in the FIGURE, having mechanical properties (such as strength and modulus) typical of prior-art, rigid, polymeric, syntactic foams, with the additional benefits of having a tailorable density and an ability to be readily disintegrated by dissolution of the resin matrix with environmentally benign, non-toxic, solvents. The microballoons 1 are represented as circles in the FIGURE, and the space between the microspheres represents the interstitial volume 2 containing dried polymer resin, the amount of which is determined by the degree to which the undried slurry is vacuum filtered to remove unwanted solute polymer and solvent solution.

The following examples are provided as illustrative of the present invention and are not intended to limit its scope in any way:

EXAMPLE 1

To 8.01 grams of 3M brand D32/4500 Scotchlite ® glass microspheres are added 31.98 gram of a 25% solution, by weight, of 60:40 poly(N-vinylpyrrolidone-vinyl acetate) copolymer, molecular weight 100,000, in absolute ethyl alcohol, representing a 4:1 weight ratio of starting solution to microspheres. The components are stirred for about 5 minutes by hand until a uniform slurry is obtained. The resulting slurry is vacuum filtered at 150 Torr through a number 1 Whatman filter paper in a filter assembly 1.125 inch diameter and 1.25 inch high. The filtering process is facilitated by coating the filter assembly with a Miller-Stephenson MS 122N/CO2 release agent. After approximately 5 minutes, additional slurry is added to the filter funnel to compensate for the volume loss. The filtration process is continued for an additional 50 to 60 minutes. At this point, the filter funnel is removed and placed in an oven at 74.2 deg C. at ambient pressure for 19.5 hours. The resulting plug of foam is easily removed from the funnel by tapping gently and pushing on the plug. This procedure yields a foam of density 0.23 gram/cc, a tensile modulus of 41,110 psi, and a compression modulus of 69,276 psi. In this foam and in the following examples, scanning electron microscopy of a fracture surface reveals an open-cell structure with a relatively large (77±5%) interstitial void volume compared with conventional syntactic foams whose interstices are filled. A reduction in the amount of filtering would have resulted in less void volume as less solution would have been removed from around the microspheres before the drying step. Adhesive bonding of the microspheres by the copolymer is also apparent. Treatment with water or low-molecular weight alcohol at ambient temperature causes rapid disintegration of the foam into microspheres and copolymer dissolved in solvent water or low-molecular weight alcohol, as the case may be.

EXAMPLE 2

A foam sample is prepared as in Example 1 except the ratio of starting solution to microspheres is changed to 2.5:1. This yields a foam with a density of 0.24 gram/cc, a tensile modulus of 52,320 psi, and a compression modulus of 95,745 psi.

It is seen from Examples 1 and 2 that by merely adjusting the ratio of starting solution to microspheres, the strength characteristics of a soluble foam may be altered.

EXAMPLE 3

A foam sample is prepared as in Example 1 except that Expancel® 051 DU thermoplastic hollow spheres from Nobel Industries, Sweden, is used instead of the glass microspheres. Upon heating, these thermoplastic spheres expand as the gas contained therein expands. The Expancel foam, filling about ⅔ of the filter assembly after the initial heating, is placed in an oven at 120.8 deg C. at ambient pressure for 2 hours. This treatment increases the volume of the foam to about ⅞ of the filter assembly volume.

The resulting plug is softer than the foams made from glass microspheres and has a density of 0.37 gram/cc. A compression test on this foam shows no sharp failure.

EXAMPLE 4

To 14.5 grams of a 24%, by weight, solution of 60:40 poly(N-vinylpyrrolodine-vinyl acetate) copolymer, molecular weight 100,000, in absolute ethyl alcohol is added, by stirring, 3.95 grams Q-Cell® 300 hollow glass microspheres from PQ-Corporation. The slurry is then allowed to stand at room temperature for 16 hours, and is then heated in an air-circulating oven at 68 deg C. for 32 hours to a final cure. No vacuum filtration is used.

EXAMPLE 5

A syntactic foam is prepared as described in Example 4 except that isopropyl alcohol is used in place of ethyl alcohol.

EXAMPLE 6

A syntactic foam is prepared as described in Example 4 except that 3M brand D32/4500 Scotchlite® glass microspheres are used in place of Q-Cell® 300 microspheres.

EXAMPLE 7

Syntactic foams are prepared as described in Example 4 in which the concentration of copolymer solution is varied from 5 to 25 weight percent.

As seen in the examples, practice of the invention results in a rigid, syntactic foam whose interstitial resin component is not crosslinked and, hence, soluble, and whose interstitial volume is variably filled with said resin. Such foams are manufactured in an environmentally safe process and have physical properties that are easily tailored through changes in the manufacturing process, as disclosed herein, to meet a variety of situations.

The particular sizes and equipment discussed above are cited merely to illustrate particular embodiments of this invention. It is intended that the scope of the invention be defined by the claims appended hereto.

What is claimed is:

1. A method of preparing easily removable, environmentally safe, low-density, syntactic foam comprising the steps of:
   (a) dissolving a solute polymer in suitable solvent to effect complete dissolution, the solute polyer comprising copolymer poly(N-vinylpyrrolidone-vinyl acetate);
   (b) adding microspheres to the polymer solution to form a slurry, and mixing the slurry to achieve a uniform dispersion of said microspheres in the polymer solution;
   (c) drying the slurry to remove residual solvent to obtain a rigid, syntactic foam whose interstitial resin component is not crosslinked and, hence, soluble.

2. A method of preparing easily removable, environmentally safe, low-density, syntactic foam comprising the steps of:
   (a) dissolving a solute polymer in suitable solvent to effect complete dissolution;
   (b) adding microspheres to the polymer solution and mixing to achieve a uniform dispersion of said microspheres in the polymer solution;
   (c) removing a predetermined fraction of polymer solution;
   (d) drying the slurry to remove residual solvent to obtain a rigid, syntactic foam whose interstitial resin component is a predetermined fraction of the interstitial volume, and is not crosslinked and, hence, soluble.

3. A method according to claim 1 wherein the copolymer poly(N-vinylpyrrolidone-vinyl acetate) consists of a 60:40 weight-percent ratio of the monomers, respectively.

4. A method according to claim 3 wherein the copolymer comprises 5 to 25% by weight of the copolymer-solvent solution.

5. A method according to claim 2 wherein the copolymer-solvent solution comprises 71 to 80% by weight of the initial mixture of solution and microspheres.

6. A method according to claim 2 wherein the solvent is a water/alcohol mixture, the amount of water in the mixture being between 0 and 100%.

7. A method according to claim 2 comprising the additional step of forming the slurry to a desired physical configuration prior to said drying step.

8. A method according to claim 6 wherein the alcohol is isopropyl alcohol.

9. A method according to claim 6 wherein the alcohol is ethyl alcohol.

10. A method according to claim 1 wherein the microspheres are about 10 to 180 micron in diameter.

11. A method according to claim 2 wherein the microspheres are insoluble, hollow, gas-filled glass spheres.

12. A method according to claim 2 wherein the microspheres are insoluble, hollow, gas-filled, thermoplastic spheres.

13. A method according to claim 2 wherein the removal of unwanted polymer and solvent from the initial slurry is accomplished by vacuum filtration with a filter with a pore size sufficiently small to prevent the passage of said microspheres.

14. A method according to claim 7 wherein the formed slurry is treated by heating at ambient pressure for a time and at a temperature sufficient to remove residual solvent but without detrimentally affecting the most heat-sensitive component of the product or creating bubbles in the copolymer resin.

* * * * *